(12) United States Patent
Banyay et al.

(10) Patent No.: US 11,048,095 B2
(45) Date of Patent: Jun. 29, 2021

(54) METHOD OF OPERATING A VEHICLE HEAD-UP DISPLAY

(71) Applicant: FORD GLOBAL TECHNOLOGIES, LLC, Dearborn, MI (US)

(72) Inventors: Matus Banyay, Frechen (DE); Marcus Haefner, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 683 days.

(21) Appl. No.: 15/244,920

(22) Filed: Aug. 23, 2016

(65) Prior Publication Data
US 2017/0059872 A1   Mar. 2, 2017

(30) Foreign Application Priority Data
Aug. 24, 2015   (DE) ..................... 10 2015 216 128.5

(51) Int. Cl.
| | | |
|---|---|---|
| *G06F 3/01* | (2006.01) | |
| *G02B 27/01* | (2006.01) | |
| *B60K 35/00* | (2006.01) | |
| *H04N 5/33* | (2006.01) | |
| *G02B 27/00* | (2006.01) | |

(52) U.S. Cl.
CPC ..... *G02B 27/0179* (2013.01); *G02B 27/0093* (2013.01); *G02B 2027/0181* (2013.01); *G02B 2027/0187* (2013.01)

(58) Field of Classification Search
CPC ............. G02B 27/01; G02B 27/0101; G02B 27/0093; G02B 27/0149; G02B 27/0179; B60K 35/00; B60K 2350/1096; B60K 2350/2013; B60R 2300/60; B60R 2300/70; B60R 2300/80; B60R 2300/205; B60R 2300/207; B60R 2300/301
See application file for complete search history.

(56) References Cited

U.S. PATENT DOCUMENTS

| | | | |
|---|---|---|---|
| 4,625,329 A | 11/1986 | Ishikawa et al. | |
| 5,729,619 A | 3/1998 | Puma | |
| 5,734,357 A * | 3/1998 | Matsumoto | ............ G02B 27/01 345/7 |
| 6,926,429 B2 | 8/2005 | Barlow et al. | |
| 7,605,773 B2 | 10/2009 | Janssen | |
| 2003/0142041 A1 | 7/2003 | Barlow et al. | |

(Continued)

FOREIGN PATENT DOCUMENTS

| | | |
|---|---|---|
| DE | 102004031311 A1 | 1/2006 |
| DE | 102007035505 A1 | 1/2009 |
| DE | 102008055186 A1 | 3/2010 |

*Primary Examiner* — Sardis F Azongha
(74) *Attorney, Agent, or Firm* — Frank Lollo; Brooks Kushman P.C.

(57) ABSTRACT

A method of controlling a head-up display (HUD) of a vehicle to adjust the vertical position of a light bundle generated by the HUD to match an eye of a vehicle driver. A camera is operated to capture an image of a head of the vehicle driver reflected in a combiner of the head-up display. An electronic processor analyzes the image captured by the camera and determines a position of a driver's eye. The processor controls operation of an electric motor to automatically adjust the position of the combiner to align a light bundle or eyebox generated by the projector and reflected by the combiner with the eye position determined by the processor.

18 Claims, 1 Drawing Sheet

(56) References Cited

U.S. PATENT DOCUMENTS

| | | |
|---|---|---|
| 2009/0303158 A1 | 12/2009 | Takahashi et al. |
| 2014/0177064 A1* | 6/2014 | Sugiyama .......... G02B 27/0101 359/630 |
| 2016/0202471 A1* | 7/2016 | Oguro .................... B60K 35/00 359/221.2 |

* cited by examiner

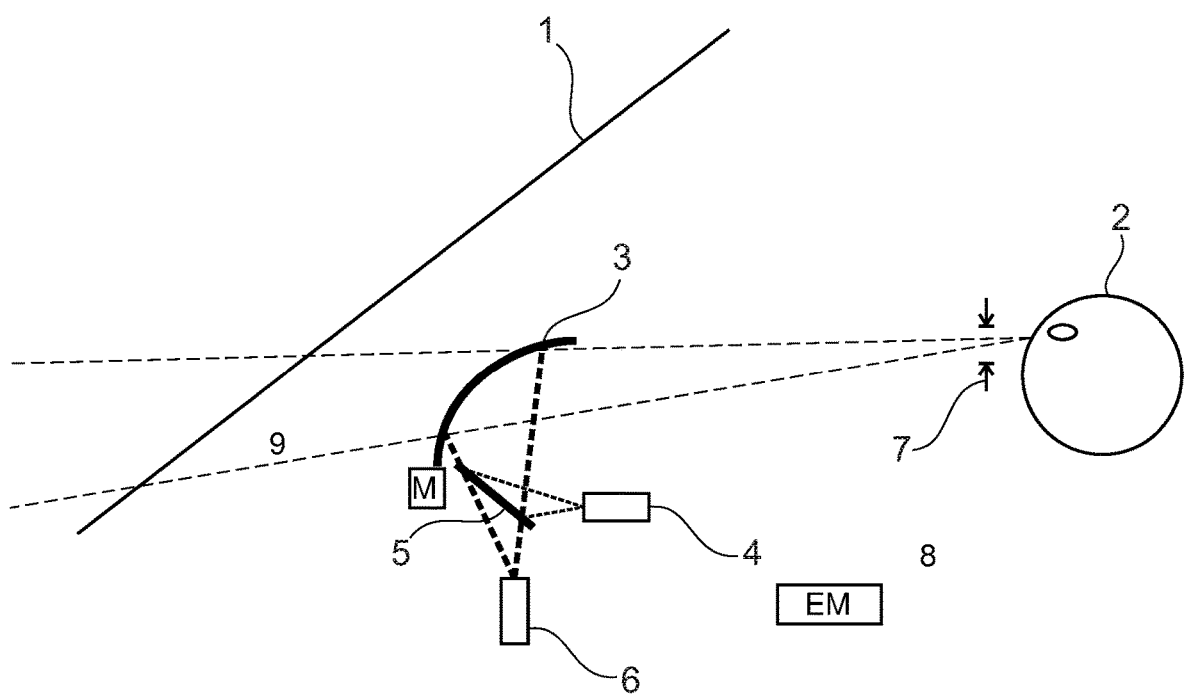

METHOD OF OPERATING A VEHICLE HEAD-UP DISPLAY

CROSS-REFERENCE TO RELATED APPLICATIONS

This application claims foreign priority benefits under 35 U.S.C. § 119(a)-(d) to DE 102015216128.5 filed Aug. 24, 2015, which is hereby incorporated by reference in its entirety.

TECHNICAL FIELD

The present invention relates in general to head-up displays (HUDs) of the type used in motor vehicles, and more specifically to a method of operating such a HUD which uses a camera to capture an image of the head of the driver which is reflected by a combiner of the HUD.

BACKGROUND

Such a method, known as eye tracking, is known from US 2003/0142041 A1 and serves for identifying occurrences of lack of focus in the driver, without a camera in the cockpit limiting the driver's view.

In general, there are two types of head-up displays in motor vehicles. One type utilizes the windshield as the surface (known in the art as a combiner) onto which a projection system projects a virtual image, which is visible to the driver, wherein the projection system comprises an image-generating unit (known in the art as a projector) and an image-forming mirror (also known as a beam splitter) which can be spherical, aspherical, or freely formed. The other type uses a combiner which is separate from the windshield, such as, e.g., a transparent plate made from glass or plastic, or a suitably designed prism. A combiner of this type is typically situated above the instrument panel, close to the windshield, as viewed by the driver, and often can be retracted into or folded down parallel with a top surface of the instrument panel. The combiner reflects the image generated by an the projector in the direction of the driver. The windshield therefore does not need to be optically corrected to display the image.

The image projected onto and reflected off of the combiner reaches the driver's eyes as a spatially-delimited light beam, which is commonly referred to as a "light bundle" in the art. The light bundle spans and defines a so-called eyebox, within which the driver's eyes must be located in order for the information displayed by the head-up display to be visible to the driver. The vertical position of the eyebox must be adapted to the sitting height of the specific driver. For this purpose, the driver has the option of adjusting the height position of the eyebox until it is optimally visible, wherein the eyes of the driver are located well within the eyebox. In order to ensure that the driver has a certain freedom of motion, within which the image remains visible, the eyebox must have a certain minimum size having a height of, typically, 50 mm. A suitable installation space for the head-up display is necessary for this purpose, in particular a certain height of the projector or of the combiner or of an image-forming mirror. Drivers also tend to sink down into their seat, in particular over the course of a relatively long trip, and so the head descends and the image displayed by the head-up display disappears; therefore, the driver must readjust the location/position of the eyebox.

The problem addressed by the invention is that of making it possible to automatically adjust the height/vertical position of the eyebox and to reduce the amount of installation space required by head-up displays.

SUMMARY

The invention utilizes a HUD of the type taught in US 2003/0142041 A1 in order to ascertain the current height position of the eyes of the driver from an image of the driver's head as viewed or captured by the camera, and to automatically adjust, with respect to the eye position ascertained in this manner, the direction of the light bundle coming from the combiner, within which the information displayed by the head-up display is visible to the driver, i.e., the position of the eyebox. In this case, the eye position is advantageously assumed to be the position of the eye ellipse or eyellipse defined in automotive engineering standards (see, for example, SAE Standard J941), which is supposed to be located approximately in the center of the eyebox. The position is adjusted preferably and at least vertically. The position can also be adjusted horizontally, in principle.

The automatic height adjustment accomplished in this way (which can be carried out the first time or any time the vehicle is started up, and even during the trip) by way of the light bundle which defines the eyebox tracking the eye position as said eye position changes over the course of the trip, relieves the driver of the task of having to adjust the eyebox before starting his trip or during the trip, and said height adjustment makes it possible to make the eyebox smaller, e.g., only approximately 20 mm tall, whereby the required installation space of the head-up display or of individual components, such as, for example, the mirror, the combiner, or the imaging unit, becomes smaller.

In one preferred embodiment of the invention, the head-up display is the type having a combiner, which is located in the light path between a windshield of the vehicle and the driver's head. The combiner is automatically pivoted, by means of an electric motor and on the basis of the ascertained eye position, in such a way that the light bundle (and so the eyebox defined thereby) aligns with the ascertained eye position. The combiner can be a transparent panel located above an instrument panel of the vehicle or can be a suitably designed prism.

Alternatively, the head-up display can be the type which utilizes the windshield as a combiner. In this case, the image-forming mirror or beam-splitter of the head-up display, for example, can be swiveled in order to adjust position of the eyebox, or the image depicted on the image-generating device can be electronically displaced.

As is known from the aforementioned document, the driver's head can be additionally illuminated with light—across the light path, across which the driver sees the image displayed by the head-up display and across which the eye tracking takes place—having a wavelength which is invisible to the human eye and is visible to the camera, e.g., with infrared light, in order to increase the contrast and reduce the red-eye effect, which simplifies the eye tracking. In this case, the aforementioned light path is used in three ways.

A description of one exemplary embodiment based on the drawing follows.

BRIEF DESCRIPTION OF THE DRAWINGS

FIG. 1 is a partial longitudinal sectional view through a motor vehicle head-up display having a combiner over the instrument panel.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As shown in FIG. 1, a transparent combiner 3, which can be retracted into and extended out of the instrument panel by means of an electric motor, is located in a motor vehicle having a head-up display (HUD) on top of the instrument panel and relatively close to a windshield 1 and in the driver's field of view, wherein only the driver's head 2 is schematically indicated.

The combiner 3 reflects an image projected onto it by a projector 4 (which generates and projects the light bundle to generate the image) via a beam splitter 5 in the direction of the eyes of the driver and combines said image with the part of the scene ahead of the vehicle that is viewed through the combiner 3, as indicated using dashed lines. The combiner 3 can be pivoted about the transverse axis of the vehicle within a small angle range by an electric motor 9. Alternatively, the entire head-up display can be pivoted by a motor.

The image projected onto the combiner 3 and reflected thereby reaches the driver as a spatially-delimited light bundle, which defines what is known in the HUD art as an eyebox (also known as a head movement box), within which the information displayed by the head-up display is visible to the driver. The terms "light bundle" "eyebox" and "head movement box" are terms-of-art, the meanings of which are understood by persons of ordinary skill in the pertinent art.

A camera 6 is mounted below the combiner 3 (so as to not interfere with the driver's vision or clutter the interior of the vehicle) and receives the image of the driver's head 2, which is reflected in the combiner 3 and has passed through the beam splitter 5, as indicated using dashed lines. A computer processor or electronic module (EM) 8 serves as an image evaluation device and carries out simple eye tracking in order to ascertain the position of the eyellipse (as defined in SAE Standard J941) and compare it to the current position of the eyebox generated by the HUD, the upper and lower edges of which are illustrated at 7. If necessary, the combiner 3 is pivoted in such a way that the eyellipse is located approximately in the center of the eyebox.

This means that the driver's eyes are observed using the camera 6 which receives an image of the driver's head 2 reflected in the combiner 3, wherein the position of the driver's eyes is ascertained on the basis of the image of the driver's head 2 as viewed by the camera 6, and wherein the direction of a light bundle reflected toward the driver's head from the combiner 3, within which the information displayed by the head-up display is visible to the driver, is automatically adjusted to match the eye position thus ascertained, by way of the combiner 3 being automatically swiveled, on the basis of the ascertained eye position, in such a way that the light beam aligns with the ascertained eye position.

Due to this automatic adjustment of the height position of the eyebox, the eyebox can be made smaller than is normally required, e.g., only 20 mm instead of 50 mm tall. This smaller eyebox can be generated using a smaller head-up display or using smaller individual components (mirror, combiner, imaging unit).

The camera 6 can be an infrared camera, and the driver's head 2 can be illuminated with infrared light which is coupled into the common light path via another, non-illustrated, beam splitter and is reflected on the combiner 3. As is well known, infrared light is not visible to the human eye.

In addition, the image-evaluating processor carries out true eye tracking on the basis of the camera image, in which fixations and eye movements by the driver are detected. The fixations and eye movements may be compared with the scene ahead of the vehicle, which is synthesized from images from cameras observing the scenery, from information in a navigation system, and from the Internet, in order to select which information to display to the driver depending on the driver's fixations and eye movements.

In particular, a check is carried out to determine whether the driver is looking at an object or region within his field of view, about which information or additional information relevant to the driver is available. If this is the case, the corresponding relevant information is obtained and is displayed by means of the head-up display, whereas information which does not appear to be relevant at the time, due to the driver's viewing direction, is hidden from the display.

For example, if the driver is looking at a preceding vehicle, that processing vehicle's speed may be displayed; if the driver is looking in the direction of a gas station, the current price of gas at that station may be displayed; and if the driver is looking at a traffic sign or the like, then, in the case of a highway sign, for example, current traffic messages may be displayed or, in the case of a prohibitive or danger sign, the duration of the prohibition or the danger may be displayed.

In addition, expanded image evaluations can be carried out, e.g., for facial recognition and driver assistance.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a head-up display of a vehicle comprising:
    operating a camera to capture an image of a head of a driver reflected in a combiner of the head-up display;
    operating a processor to analyze the image to determine a position of an eye of the driver; and
    automatically adjusting a position of the combiner to align a light bundle generated by the projector and reflected by the combiner with the position of the eye.

2. The method of claim 1, wherein the combiner comprises a screen located between a windshield of the vehicle and the head.

3. The method of claim 2, wherein the position of the combiner is adjusted by operating a motor to pivot about an axis aligned transverse relative to the vehicle.

4. The method of claim 1, wherein the method is carried out when the vehicle is started up.

5. The method of claim 1, wherein the method is carried out during a trip of the vehicle.

6. The method of claim 1, further comprising illuminating the head with light having a wavelength which is invisible to a human eye and is visible to the camera.

7. A method of controlling a head-up display of a vehicle comprising:

operating a camera to capture an image of a head of a driver reflected in a combiner of the head-up display;

operating a processor to analyze the image to determine a position of an eye of the driver; and automatically adjusting a position of the combiner to align an eyebox generated by the head-up display with the position of the eye.

8. The method of claim 7, wherein the combiner comprises a screen located between a windshield of the vehicle and the driver's head.

9. The method of claim 8, wherein the position of the combiner is adjusted by operating a motor to pivot about an axis aligned transverse relative to the vehicle.

10. The method of claim 7, wherein the method is carried out when the vehicle is started up.

11. The method of claim 7, wherein the method is carried out during a trip of the vehicle.

12. The method of claim 7, further comprising illuminating the head with light having a wavelength which is invisible to a human eye and is visible to the camera.

13. A method of operating a vehicle head-up display comprising:

operating a camera to capture an image of a head of a driver reflected by a combiner of the head-up display;

operating a processor to determine a position of an eye of the driver from the image; and automatically adjusting a position of the combiner to align an eyebox produced by the head-up display with the position of the eye.

14. The method of claim 13, wherein the combiner comprises a screen located between a windshield of the vehicle and the driver's head.

15. The method of claim 14, wherein the position of the combiner is adjusted by operating a motor to pivot about an axis aligned transverse relative to the vehicle.

16. The method of claim 13, wherein the method is carried out when the vehicle is started up.

17. The method of claim 13, wherein the method is carried out during a trip of the vehicle.

18. The method of claim 13, further comprising illuminating the head with light having a wavelength which is invisible to a human eye and is visible to the camera.

\* \* \* \* \*